United States Patent
Feldmann et al.

(10) Patent No.: US 11,208,908 B2
(45) Date of Patent: Dec. 28, 2021

(54) STATIC SEAL ARRANGEMENT AND TURBOMACHINE

(71) Applicant: MTU Aero Engines AG, Munich (DE)

(72) Inventors: Manfred Feldmann, Eichenau (DE); Simon Schmalfuss, Munich (DE)

(73) Assignee: MTU Aero Engines AG, Munich (DE)

( * ) Notice: Subject to any disclaimer, the term of this patent is extended or adjusted under 35 U.S.C. 154(b) by 123 days.

(21) Appl. No.: 16/704,881

(22) Filed: Dec. 5, 2019

(65) Prior Publication Data

US 2020/0200030 A1    Jun. 25, 2020

(30) Foreign Application Priority Data

Dec. 21, 2018   (DE) .................... 10 2018 222 827.2

(51) Int. Cl.
 *F01D 11/00* (2006.01)
 *F16J 15/3288* (2016.01)
(52) U.S. Cl.
 CPC ......... *F01D 11/005* (2013.01); *F16J 15/3288* (2013.01); *F05D 2220/32* (2013.01); *F05D 2240/56* (2013.01)
(58) Field of Classification Search
 CPC ...... F01D 11/00; F01D 11/001; F01D 11/005; F05D 2220/32; F05D 2240/56; F16J 15/3288; F16J 15/164
 See application file for complete search history.

(56) References Cited

U.S. PATENT DOCUMENTS

| | | | |
|---|---|---|---|
| 5,074,748 A | 12/1991 | Hagle | |
| 5,265,412 A * | 11/1993 | Bagepalli | F02K 1/805 60/800 |
| 5,480,162 A * | 1/1996 | Beeman, Jr. | F01D 9/023 277/355 |
| 6,988,369 B2 | 1/2006 | Conete et al. | |
| 9,920,641 B2 | 3/2018 | Farah et al. | |
| 2004/0256807 A1 * | 12/2004 | Bhate | F16J 15/3288 277/355 |
| 2010/0327535 A1 | 12/2010 | Grace et al. | |
| 2017/0335705 A1 * | 11/2017 | Tyler, Jr. | F01D 11/02 |

FOREIGN PATENT DOCUMENTS

| | | |
|---|---|---|
| DE | 10351583 A1 | 6/2005 |
| DE | 102010032846 A1 | 2/2012 |
| DE | 102011083814 A1 | 4/2013 |
| EP | 0500486 B1 | 5/1995 |
| EP | 1848905 B1 | 1/2010 |
| EP | 2990699 A1 | 3/2016 |
| EP | 3239472 A1 | 11/2017 |
| EP | 2905428 B1 | 4/2018 |
| FR | 3011585 A1 | 4/2015 |
| GB | 2356022 A | 5/2001 |

* cited by examiner

*Primary Examiner* — Woody A Lee, Jr.
*Assistant Examiner* — Maxime M Adjagbe
(74) *Attorney, Agent, or Firm* — Barlow, Josephs & Holmes, Ltd.; David R. Josephs

(57) ABSTRACT

Disclosed is a static seal arrangement for sealing a gap between a first static component and a second static component of a turbomachine such as an aircraft engine or a static gas turbine, having a brush seal held distant from a hot gas, this brush seal being arranged standing or vertical with its clamping section that can be surrounded by cooling air in a radially outer clamping space relative to the gap, and forming a radial sealing site with the first component and an axial sealing site with the second component; also disclosed is a turbomachine.

18 Claims, 2 Drawing Sheets

STATIC SEAL ARRANGEMENT AND TURBOMACHINE

BACKGROUND OF THE INVENTION

The present invention relates to a static seal arrangement for sealing a gap between a first static component and a second static component of a turbomachine, and a turbomachine.

In the case of turbomachines such as aircraft engines, stationary gas turbines and the like, one usually strives to seal possible leakage gaps between static components, such as walls of an annular space lying axially behind one another and belonging to two adjacent housing modules. The sealing of a gap between two static components is also called a static seal. The seal of a gap between a static component and a moving component is referred to as a dynamic seal. A seal arrangement for sealing two static components of a turbomachine with a piston ring is known from U.S. Pat. No. 9,920,641 B2. Due to the high temperatures prevailing during operation of the turbomachine, prestressing or bias of the piston ring may be strongly reduced due to creep and thus the ring loses its sealing function. Alternatively, seal arrangements with a sealing plate are often employed. This kind of seal arrangement is shown in U.S. Pat. No. 6,988,369 B2. This form of the seal arrangement, however, requires a relatively large installation space, since the sealing plate needs to have a large radial height in order to equilibrate axial displacements of the static components that are to be sealed against each other. Another frequently employed seal arrangement provides for the use of a lying or horizontal brush seal in order to seal a gap between two static components. These kinds of static seal arrangements are shown, for example, in DE 10 2010 032 846 A1, DE 10 2011 083 814 A1, DE 103 51 583 A1 and in EP 1 848 905 B1. Furthermore, EP 1 848 905 B1 shows dynamic seal arrangements having a standing or vertical brush seal for sealing a gap between a component on the stator side and a component on the rotor side.

SUMMARY OF THE INVENTION

The object of the invention is to create an improved static seal arrangement for sealing a gap between a first static component and a second static component of a turbomachine, as well as to create a turbomachine having an improved seal arrangement at housing interfaces.

This object is achieved by a seal arrangement and by a turbomachine of the present invention.

A static seal arrangement according to the invention for sealing a gap between a first static component and a second static component of a turbomachine has at least one brush seal. The brush seal is accommodated with its head in a radially outer clamping space with respect to the gap, referred to the longitudinal axis of the machine, in such a way that its package of bristles extends in the radial direction of the turbomachine. It is thus arranged vertically. The brush seal forms a sealing site with each component, whereby it forms a radial sealing site with the first component and an axial sealing site with the second component.

In the seal arrangement according to the invention, the brush seal is arranged outside the flow of hot gas and thus is protected from high temperatures. The seal arrangement according to the invention can thus be used on the turbine side, for example in the region of a turbine midframe. Plastic deformations of the brush package are prevented due to maintaining a distance from high temperatures, so that the seal arrangement according to the invention achieves its sealing action inside the turbomachine even in the case of high temperatures. By bending the bristles or the bristle wires, radial displacements at the radial sealing site of the brush seal can be equilibrated. The possible radial stroke of the brush seal can be adjusted by selecting the length, thickness and angle of attack of the bristles. The brush package is reliably applied at the axial sealing site by a pressure difference resulting during the operation of the turbomachine. In a preferred example of embodiment, the first component and the second component are each wall structures of an annular space for forming a section of said annular space through which flows the hot gas. In this case, as a rule but not necessarily always, the first component is arranged in front of the second component in the flow direction of the hot gas. Alternatively, the second component can be arranged in front of the first component.

Preferably, the components have two axially overlapping cylinder sections. In this case, the brush seal forms the radial sealing site with the cylinder section of the first component and forms the axial sealing site with the cylinder section of the second component. The axial overlapping of the first and second components brings about a reliable heat protection of the brush seal relative to high temperatures and makes possible an equilibration of relative axial displacements of the two components with respect to one another, without the danger that the bending-stressed outer part of the brush seal is directly subjected to the hot gas. On the other hand, axial displacements of the bristle package can be equilibrated at the radial sealing site.

If the clamping space of the brush seal is open to a sealing air space, the brush seal can be cooled at the place where it is clamped, i.e., at the brush head.

The clamping space is preferably arranged on the end side of a radial projection of a support housing that accommodates the two components. By placing the brush seal at the support housing, only small relative movements arise, which can be equilibrated by the flexibility of the bristle package. Simultaneously, a first sealing air space and a second sealing air space are separated by the radial projection, so that the sealing air is guided in a targeted manner to the brush seal.

A radial gap can be formed between the cylinder section of the second component and the radial projection. On the one hand, the radial gap makes possible an equilibration of heat tolerances of the radial projection and of the second component. A radial contact will be avoided. If, additionally, a lower sealing air pressure prevails in the back sealing air space, the radial gap can act as a passage for fluid, by which sealing air from the first sealing air space can flow into the second sealing air space. This has several advantages. On the one hand, the sealing air that flows through the brush package outside the first sealing site can be used further as sealing air in the subsequent sealing air spaces or cavities. On the other hand, the leakage of sealing air through the outer part of the brush seal outside the axial sealing air site cools the bristles of the brush seal at the site of maximum stress and, in fact, at the clamping site.

The mounting of the seal arrangement in the turbomachine can be facilitated if the support housing is divided axially into a first housing module for accommodating the first component and into a second housing module for accommodating the second component.

The mounting can be facilitated still further if the radial projection is assigned to the second support housing. The stability of the mounted components can be increased if the second component is joined to the radial projection. Therefore, the second component is held radially inside. Preferably, it is held at the radial height of the clamping space.

The mounting can be further simplified if the second component in the peripheral direction of the turbomachine is divided into segments. In order to equilibrate thermal stresses, adjacent segments are distanced from one another in each case by way of a segment gap in the peripheral direction. To avoid a buckling of the bristles in the direction of flow during operation, it is advantageous if each bristle is applied to one segment. Due to this measure, the bristles are held radially outside at their head sections and are also axially supported radially inside. An exemplary lying or placement angle of the bristles is 45° in the radial direction of the turbomachine. In order to avoid a threading and a damaging of the bristles in the respective segment gap, the gap height is relatively large in comparison to the gap width.

In order to ensure as large an equilibration of heat expansions as possible, the segment gaps may be designed correspondingly wide. In this case, moreover, in order to ensure a contact of each bristle at one segment, one exemplary embodiment provides for tipping or tilting the segment gaps opposite the placement angles. The segment gaps then no longer run strictly radially, but also contain a component on the peripheral side. The segment gaps run obliquely when viewed in the radial direction, whereby it is advantageous if the segment gaps run counter to the bristles.

A turbomachine according to the invention, such as an aircraft engine, a static gas turbine or an industrial turbine has at least one seal arrangement according to the invention. Such a turbomachine is characterized by an improved efficiency relative to a comparable conventional turbomachine.

Other advantageous embodiment examples of the invention are the subject of further dependent claims.

BRIEF DESCRIPTION OF THE DRAWING FIGURES

Preferred examples of embodiment of the invention will be explained in more detail in the following on the basis of very simplified schematic representations. Herein:

DESCRIPTION OF THE INVENTION

Figure 1:
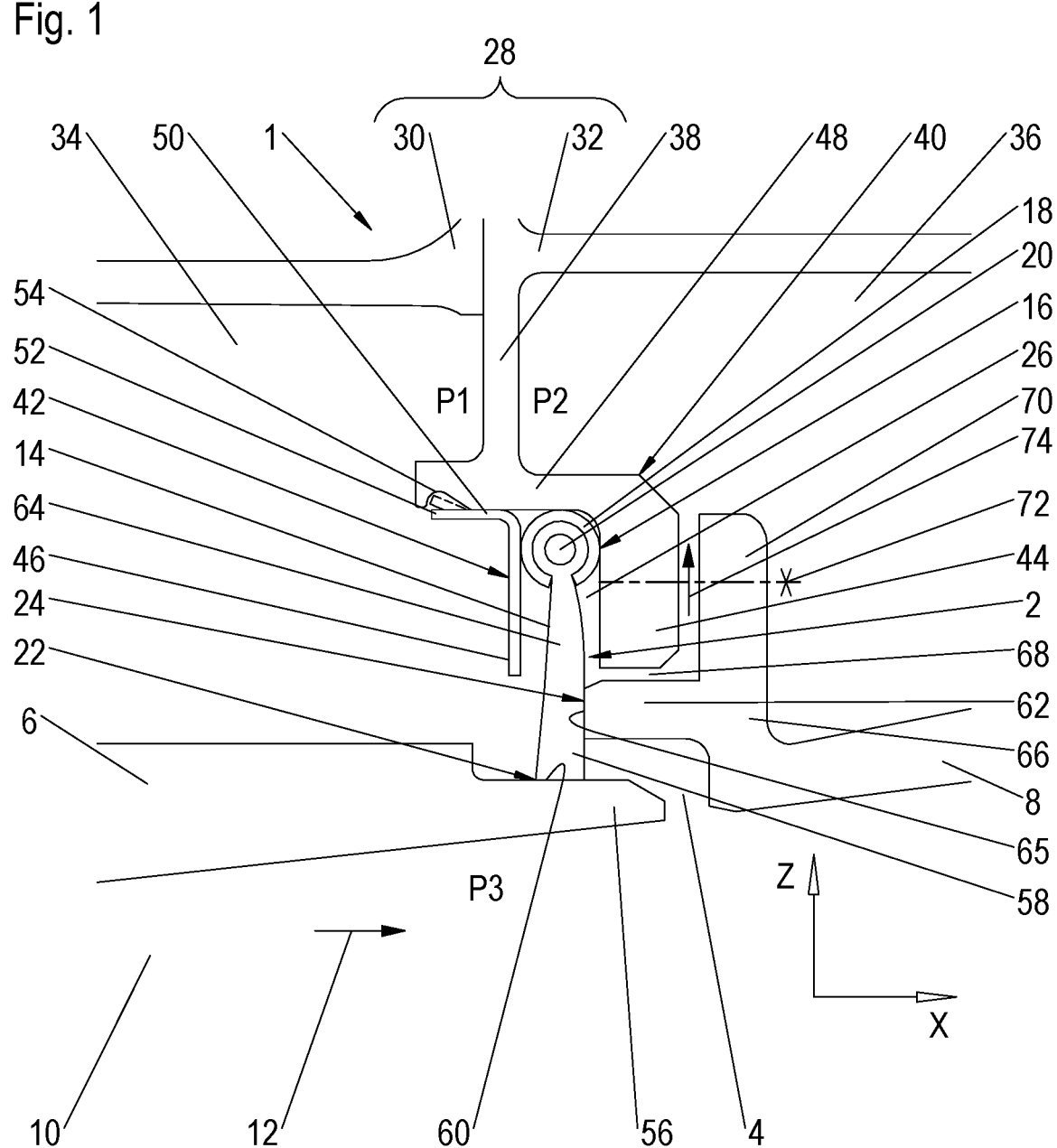
FIG. 1 shows a longitudinal section through a seal arrangement according to the invention mounted in a turbomachine.

FIG. 1 shows a longitudinal section through a static seal arrangement 1 with a brush seal 2 according to the invention. The seal arrangement 1 is used for sealing a gap 4 between a first static component 6 and a second static component 8 of a turbomachine.

The turbomachine is, for example, an aircraft engine, a stationary gas turbine of a power plant, or an industrial turbine. It has a longitudinal machine axis x or a rotor rotation axis extending in the axial direction and an annular space 10 coaxially surrounding the longitudinal machine axis. On the turbine side, a hot gas flows essentially in the axial direction, through the annular space in the region of the components 6, 8, which is indicated by the arrow 12. The flow direction 12 of the hot gas thus essentially corresponds to the longitudinal machine axis x in the region of the components 6, 8.

Details or terms such as "axial direction", "radial direction", and "peripheral direction", "axially" or "radially" refer to the longitudinal machine axis of the turbomachine.

For example, the components 6, 8 are each a wall structure of the annular space 10 relative to the radial boundary of said annular space. In the following, the first component 6 is designated as the front component and the second component is designated as the back component.

The brush seal 2 is formed as a ring with a plurality of bristles 14, which together form a bristle package. The bristles 14 are supported at their radially outer end in a brush head 16 and are clamped via an outer sheet metal ring 18. A central core 20 can be arranged inside the brush head 16.

According to the invention, the brush seal 2 is arranged standing or vertically, so that its bristles 14 extend radially toward the inside from the brush head 16. "Standing" in the sense of the invention means that the brush seal 2 has a maximum absolute inclination of at most 30° to the radial direction z. Viewed in the radial direction z, the brush head 16 lies directly outside relative to the bristles 14. According to the invention, the brush seal 2 also forms a radial sealing site 22 with the front component 6 and an axial sealing site 24 with the back component 8. Their positioning is produced by way of a clamping space 26, which is found radially outside relative to gap 4 and represents a part of a support housing 28.

The support housing 28 is arranged radially outside of components 6, 8. It is composed of two housing modules 30, 32 that are joined together detachably or of a front housing module 30 and a back housing module 32, each of which are bounded by a sealing air space 34, 36 in back of the components 6, 8. Each housing module 30, 32 holds a component 6, 8. The front sealing air space 34 and the back sealing air space 36 are separated from one another by way of a radial projection 38 extending from the back housing module 32 radially toward the inside. The brush seal 2 is arranged on the free end of the radial projection 38. It forms a quasi-radial extension of the radial projection 38 up to the radial sealing site 22.

The sealing air spaces 34, 36 serve for taking up sealing air or cooling air. The sealing air brings about a cooling of the components 6, 8 and of the brush seal 2 on the back side. During operation the following pressure ratio applies between the sealing air spaces 34, 36 to each other and to the annular space 10. The pressure p1 of the sealing air in the front sealing air space 34 is greater than the pressure p2 of the sealing air in the back sealing air space, and the latter pressure is greater than the pressure p3 of the hot gas in the annular space 10. A pressure drop thus reads $p1>p2>p3$. A configuration alternative thereto may be that the pressure drop reads: $p2>p1>p3$. The brush seal 2 is then arranged in a mirror image when viewed correspondingly in the axial direction x. Preferably, the radial projection 38 as well as the first and second static components are also arranged in mirror image when viewed in the axial direction x.

For the arrangement of the brush seal 2, the free end of the radial projection 38 is formed as an L-shaped end section 40 that forms the clamping space 26 together with an exemplary L-shaped clamping piece 42. The axial securing of the brush seal 2 can also be produced, for example, by way of an axially screwed round piece or a spiral locking ring. A clamping space 26 is formed between a radial wall structure 44 of the end section 40 and an upstream radial clamping piece 46 of the clamping piece. Radially outside, the clamping space 26 is bounded via a cylinder wall structure 48 of the end section 40. Radially inside, the clamping space 26 opens to the front sealing air space 34. In the mounted state shown, the brush seal is clamped between the radial wall structure 44 and the clamping piece 46. It lies with its head 16 at the cylinder wall structure 48 and projects from the clamping space 26 radially toward the inside by its bristles 14. In order to secure the clamping piece 46 in its clamping position, it can have a cylinder-shaped holding piece 50 pointing axially away from the radial wall structure 44 and this holding piece engages in corresponding locking recesses 54 by way of plastically deformable locking tabs 52.

The radial sealing site 22 is formed between a back cylinder section 56 of the front component 6 extending axially in the direction of the second component 8 and a free bristle end 58. The brush seal 2 lies virtually with its bristle end 58 in the radial direction perpendicular to a radially outer peripheral face 60 of the back cylinder section 56. The back cylinder section 56 projects in the flow direction 12 axially by way of the clamping space 26.

The axial sealing site 24 is formed between a front cylinder section 62 extending axially in the direction of the front component 6 and a middle section 64 of the bristles 14. The brush seal 2 is applied by its middle section 64 axially at an annular end face 65 of the front cylinder section 62 of the back component 8.

The front cylinder section 62 of the back component 8 is arranged radially outside relative to the front cylinder section 56. It extends from an annular web 66 on the back side of the back component 8. It is found with the back cylinder section 56 of the first component 6 in axial overlap and is thus radially distanced from the latter. Between the two cylinder sections 56, 62, the gap 4 extends from the annular space 10 to the front sealing air space 34. The front cylinder section 62 of the back component 8, when viewed axially, extends counter to the flow direction 12 via the radial wall structure 44 and ends with its annular end face 65 in front of the latter radially inside with respect to the clamping space 26. It is distanced radially from the cylinder wall structure 62, so that an annular gap 68 is formed between the radial wall structure 44 and the front cylinder section 62 of the back component 8.

In order to connect the back component 8 to the back housing module 32, corresponding flange sections 70 extend from the annular web 66 and by means of these flange sections, the front cylinder section 62 of the back component 8 can be joined preferably in detachable manner to the radial wall structure 44 with the use of suitable fastening means 72, such as screws or pins, which permit an axial displacement.

As indicated by the arrow 74, due to the higher pressure p1 in the front sealing air space 34 than in the back sealing air space 36 during operation, there results a leakage of sealing air through the annular gap from the front sealing air space 34 into the back sealing air space 36. Due to the leakage of sealing air 74, the bristles 14 are cooled outside of the axial sealing site 24. Additionally, the brush head 16 is cooled by the sealing air of the front sealing air space 34 which is found in the clamping space 26. The brush seal 2 is thereby cooled at the site of its highest stress, i.e. at its clamping, so that a loss of prestressing or bias of the brush seal bristles 14 is prevented.

At the same time, due to the drop in pressure p1>p2>p3 between the two sealing air spaces 34, 36 in combination with the lowest pressure p3 in the annular space 10, with its middle section 64, the brush seal 2 is pressed against the annular end face 65. In addition, due to the pressure drop p1>p2>p3, hot gas is prevented from flowing from the annular space 10 through the gap 4 into the front sealing air space 34.

Figure 2:
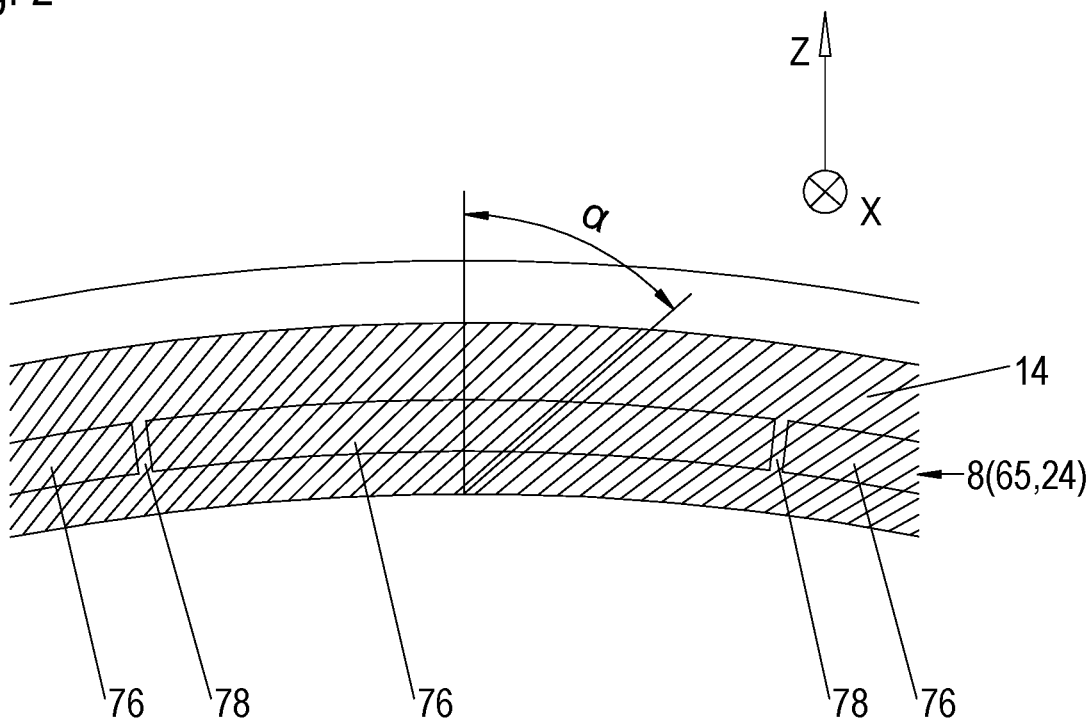
FIG. 2 shows an axial top view onto a brush seal of the seal arrangement in the installed state with straight segment gaps.

A top view onto a section of a brush seal 2 in the flow direction with the front component 6 removed is shown in FIG. 2. As can be recognized, in one exemplary embodiment, in the peripheral direction, the back component 8 is divided into segments 76, which are distanced from each other in the peripheral direction by way of a segment gap 78 in each case. The bristles 14 are positioned in the radial direction z. In order to stabilize the bristles 14, the gap width, the gap height, and the lying angle are fine-tuned to one another, so that each bristle 14 is applied to at least one segment 76 of the back component 8 axially or to segmented annular faces forming the axial sealing site 24 (annular end face 65 divided by the number of segments 76). In the exemplary embodiment shown here, the bristles 14 have a lying angle $\alpha=45°$. The segment gaps 78 run straight in the radial direction z. Their radial height is preferably basically greater than their width in the peripheral direction. The segment gaps 76 are closed by means of sealing strips, which are not shown.

Figure 3:
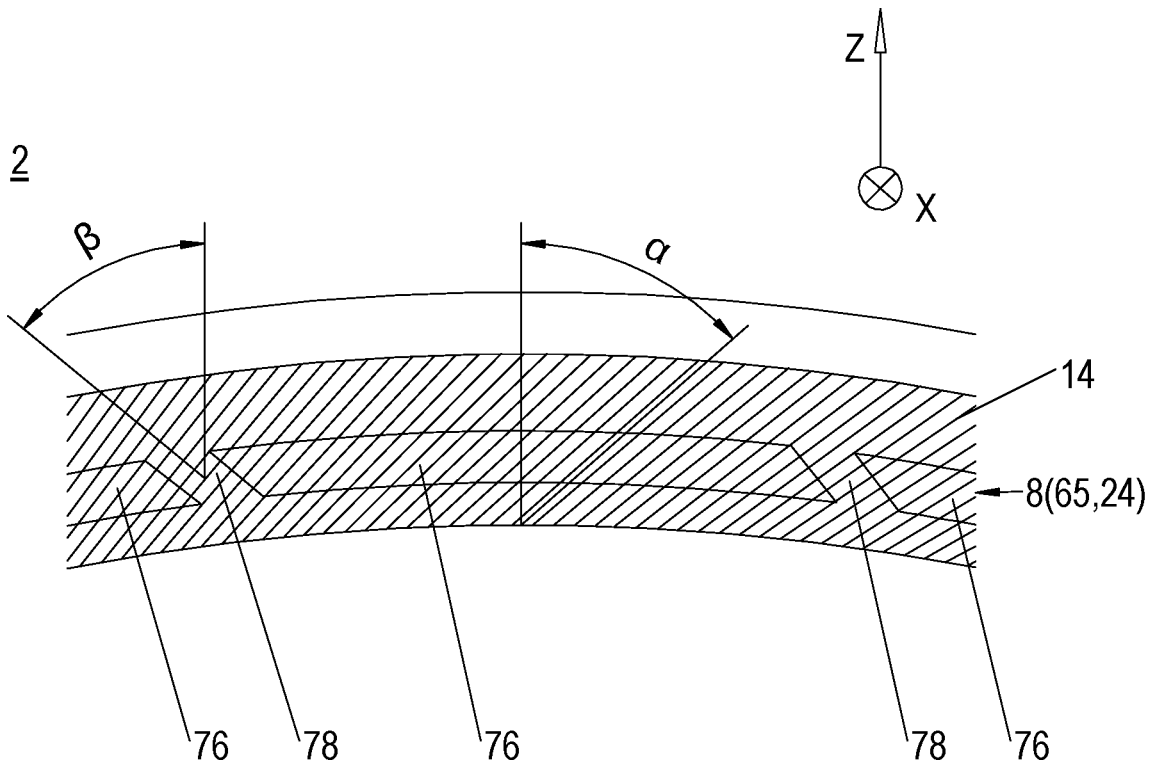
FIG. 3 shows an axial top view onto a brush seal of the seal arrangement in the installed state with oblique segment gaps.

FIG. 3 shows a top view onto a section of a brush seal 2 in the flow direction, with the front component 6 removed, in another exemplary embodiment according to the invention. In distinction from the exemplary embodiment according to FIG. 2, in the case of the exemplary embodiment according to FIG. 3, the segment gaps 78 are positioned between adjacent segments 76 of the back component 8 in the radial direction. The segment gaps 78 are tilted or tipped counter to the bristles 14 by a tilting or tipping angle $\beta$, wherein they run counter to the bristles 14. Due to the tilting or tipping, the segment gaps 78 are designed with a larger gap width than when compared to the strictly radial alignment of the segment gaps 76 shown in FIG. 2, so that greater heat expansions are possible. In order to stabilize the bristles 14, the gap width, the gap height, the tilting or tipping angle $\beta$, and the lying angle $\alpha$ are fine-tuned to one another, so that each bristle 14 is applied to at least one segment 76 of the back component 8 axially or to segmented annular faces forming the axial sealing site 24 (annular end face 65 divided by the number of segments 76).

It should be mentioned that although only one segmentation of the back component 8 is shown in FIG. 3, the front component 6, the front housing module 30, and/or the back housing module 32 can be likewise segmented in the peripheral direction.

Disclosed is a static seal arrangement for sealing a gap between a first static component and a second static component of a turbomachine such as an aircraft engine or a static gas turbine, having a brush seal held distant from the hot gas, this brush seal being arranged essentially standing or vertical with its clamping section that can be surrounded by cooling air in a radially outer clamping space relative to the gap, and forming a radial sealing site with the first component and an axial sealing site with the second component; also disclosed is a turbomachine.

It would be appreciated by those skilled in the art that various changes and modifications can be made to the illustrated embodiments without departing from the spirit of the present invention. All such modifications and changes are intended to be covered by the appended claims.

What is claimed is:
1. A static seal arrangement for sealing a gap between a first static component and a second static component of a turbomachine, comprising:

a brush seal that is arranged standing or vertical with its head in a radially outer clamping space relative to the gap and that forms a radial sealing site with the first component and an axial sealing site with the second component, wherein the first static component and the second static component have two axially overlapping cylinder sections and the brush seal forms the radial sealing site with the cylinder section of the first static component and forms the axial sealing site with the cylinder section of the second static component.

2. The seal arrangement according to claim 1, wherein the clamping space of the brush seal is open to a sealing air space.

3. The seal arrangement according to claim 1, wherein the clamping space is arranged on an end side of a radial projection of a support housing, which accommodates the first static component and the second static component.

4. The seal arrangement according to claim 1, wherein an annular gap is formed between the cylinder section of the second static component and the radial projection.

5. The seal arrangement according to claim 3, wherein the support housing is divided axially into a first housing module for an uptake of the first static component and into a second housing module for an uptake of the second static component.

6. The seal arrangement according to claim 3, wherein the radial projection is assigned to a second housing module and the second static component is joined to the radial projection.

7. The seal arrangement according to claim 1, wherein the brush seal stands with a maximum absolute inclination of 30° to the radial direction.

8. The seal arrangement according to claim 1, wherein the seal arrangement is configured and arranged in a turbomachine.

9. A static seal arrangement for sealing a gap between a first static component and a second static component of a turbomachine, comprising:

a brush seal that is arranged standing or vertical with its head in a radially outer clamping space relative to the gap and that forms a radial sealing site with the first component and an axial sealing site with the second component wherein, in a peripheral direction, the second static component is divided into segments, which are distanced from each other in the peripheral direction by way of a segment gap in each case, and bristles of the brush seal are aligned in a radial direction, so that each bristle is supported axially at one of the segments.

10. The seal arrangement according to claim 9, wherein the segment gaps are positioned in the radial direction between adjacent segments.

11. The seal arrangement according to claim 9, wherein the clamping space of the brush seal is open to a sealing air space.

12. The seal arrangement according to claim 9, wherein the clamping space is arranged on an end side of a radial projection of a support housing, which accommodates the first static component and the second static component.

13. The seal arrangement according to claim 12, wherein the support housing is divided axially into a first housing module for an uptake of the first static component and into a second housing module for an uptake of the second static component.

14. The seal arrangement according to claim 12, wherein the radial projection is assigned to a second housing module and the second static component is joined to the radial projection.

15. The seal arrangement according to claim 9, wherein the brush seal stands with a maximum absolute inclination of 30° to the radial direction.

16. The seal arrangement according to claim 9, wherein the seal arrangement is configured and arranged in a turbomachine.

17. The seal arrangement according to claim 9, wherein the first static component and the second static component have two axially overlapping cylinder sections and the brush seal forms the radial sealing site with the cylinder section of the first static component and forms the axial sealing site with the cylinder section of the second static component.

18. The seal arrangement according to claim 17, wherein an annular gap is formed between the cylinder section of the second static component and the radial projection.

* * * * *